(12) United States Patent
Kotani et al.

(10) Patent No.: US 8,338,047 B2
(45) Date of Patent: Dec. 25, 2012

(54) SOLID OXIDE FUEL CELL

(75) Inventors: Takafumi Kotani, Naka (JP); Naoya Murakami, Naka (JP)

(73) Assignees: Mitsubishi Materials Corporation, Tokyo (JP); Tha Kansai Electrical Power Co., Inc., Osaka (JP)

(*) Notice: Subject to any disclaimer, the term of this patent is extended or adjusted under 35 U.S.C. 154(b) by 426 days.

(21) Appl. No.: 11/884,759

(22) PCT Filed: Feb. 15, 2006

(86) PCT No.: PCT/JP2006/302626
§ 371 (c)(1),
(2), (4) Date: Sep. 2, 2008

(87) PCT Pub. No.: WO2006/090621
PCT Pub. Date: Aug. 31, 2006

(65) Prior Publication Data
US 2009/0042081 A1 Feb. 12, 2009

(30) Foreign Application Priority Data

Feb. 22, 2005 (JP) ................................. 2005-045249
Jan. 5, 2006 (JP) ................................. 2006-000695

(51) Int. Cl.
*H01M 2/02* (2006.01)
(52) U.S. Cl. ........ 429/455; 429/454; 429/456; 429/457; 429/458
(58) Field of Classification Search .............. 429/12–64, 429/34, 38, 454, 455, 456, 457, 458
See application file for complete search history.

(56) References Cited

U.S. PATENT DOCUMENTS

| | | | | |
|---|---|---|---|---|
| 6,066,409 A | * | 5/2000 | Ronne et al. | 429/39 |
| 6,500,580 B1 | * | 12/2002 | Marvin et al. | 429/39 |
| 2004/0115512 A1 | * | 6/2004 | Fujii et al. | 429/38 |
| 2004/0161656 A1 | | 8/2004 | Sadamoto | |
| 2005/0221159 A1 | | 10/2005 | Harada et al. | |

FOREIGN PATENT DOCUMENTS

| | | |
|---|---|---|
| EP | 0 355 420 | 2/1990 |
| EP | 1 294 035 | 3/2003 |
| JP | 60-96775 | 7/1985 |
| JP | 62-237678 | 10/1987 |
| JP | 5-129032 | 5/1993 |
| JP | 7-201353 | 8/1995 |
| JP | 2001-155759 | 6/2001 |
| WO | 2004/077590 | 9/2004 |

OTHER PUBLICATIONS

European Search Report issued Apr. 3, 2008 in the European Application EP 06713767.

* cited by examiner

*Primary Examiner* — Patrick Ryan
*Assistant Examiner* — Ladan Mohaddes
(74) *Attorney, Agent, or Firm* — Wenderoth, Lind & Ponack, L.L.P.

(57) ABSTRACT

The present invention is a solid oxide fuel cell configuration which equalizes gas volume distributed into each power generation cell to stabilize fuel cell output and improve the output efficiency. In the present invention, a flat plate laminating type solid oxide fuel cell has a reactant gas supply manifold extending through a fuel cell stack in the laminating direction, for supplying reactant gas to each of power generation cells through gas passages of separators which are communicated with the manifold. The manifold and the passages of the separators are in communication with each other through a gas-flow throttle mechanisms.

20 Claims, 5 Drawing Sheets

F I G. 5
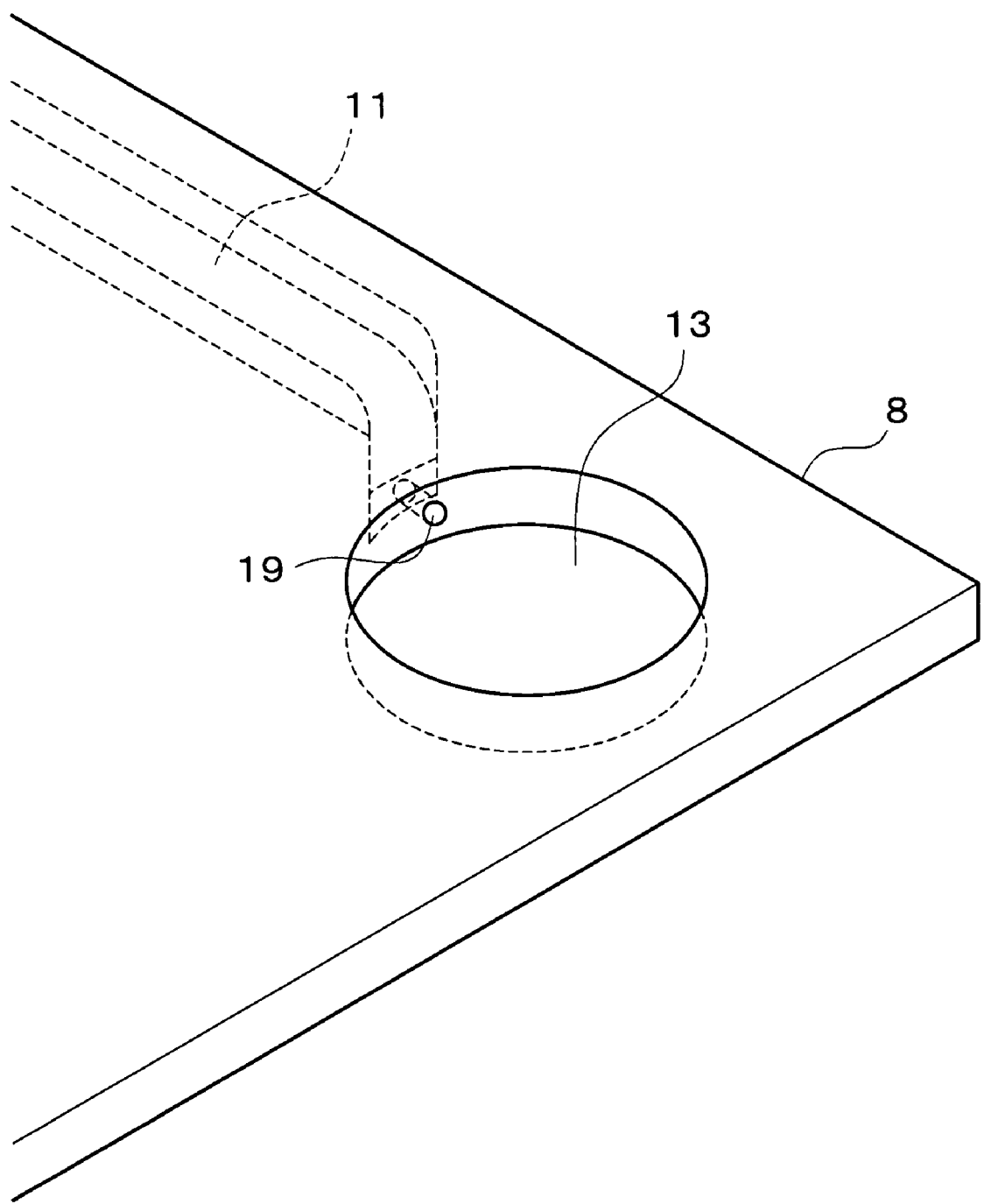

SOLID OXIDE FUEL CELL

TECHNICAL FIELD

The present invention relates to a structure for distributing reactant gas to each power generation cell of a flat plate laminated type solid oxide fuel cell using an internal manifold system.

BACKGROUND ART

Recently, a fuel cell, which directly converts chemical energy of fuel into electric energy, has drawn attention as a clean and efficient power generating device. Especially, the solid oxide fuel cell has the advantages that its power generation efficiency is high and exhaust heat can be utilized effectively, therefore, it has been developed as a third generation fuel cell for power generation. The solid oxide fuel cell has a laminated structure in which a solid electrolyte layer made of an oxide ion conductor is sandwiched between an air electrode (cathode) layer and a fuel electrode (anode) layer. At the time of power generation, oxidant gas (air) is supplied to the air electrode side, and fuel gas ($H_2$, CO, $CH_4$ or the like) is supplied to the fuel electrode side, as reactant gases. Both the air and fuel electrodes are made porous so that the reactant gases can reach their boundary with the solid electrolyte.

In the power generation cell, the oxygen supplied to the air electrode layer side reaches near the boundary with the solid electrolyte layer through the pore in the air electrode layer, and there, the oxygen receives an electron from the air electrode layer to be ionized to oxide ion ($O^{2-}$). The oxide ion is diffusively moved in the solid electrolyte layer toward the direction of the fuel electrode layer. When reaching near the boundary with the fuel electrode layer, the oxide ion reacts there with fuel gas to produce reaction products ($H_2O$, $CO_2$ and the like), and emits an electron to the fuel electrode layer. The electrons obtained by the electrode reaction are taken out as an electromotive force by an external load on another route.

The flat plate laminated type solid oxide fuel cell is constructed by alternately laminating power generation cells and separators to form a stack structure; and applying load in the laminating direction from both ends of the stack so that elements of the stack are pressure bonded and closely overlapped to each other.

The separator has a function of electrically connecting the power generation cells to each other and of supplying reactant gas to the power generation cell, and is provided with a fuel gas passage which introduces fuel gas to the fuel electrode layer side, and with an oxidant gas passage which introduces oxidant gas to the air electrode layer side.

As configurations for supplying external reactant gases to the separators, the following systems are known: an external manifold system in which an external manifold is provided on the circumference of the fuel cell stack and each gas is supplied to each of the separators through a plurality of connecting pipes; and an internal manifold system in which gas openings are formed on the peripheral portion of each separator and fuel gas and oxidant gas are supplied from the gas openings to each electrode surface of the power generation cell through the gas passages (See Patent Document 1). In the internal manifold system, the gas openings of any two adjacent separators are in communication with each other through a ring-shaped insulating gasket (spacer) interposed between the separators.

In the flat plate laminated type solid oxide fuel cell using the internal manifold system, it is generally known that each reactant gas is introduced from one end side of each manifold and is distributed and supplied into each of the separators through the gas openings of the separators in the process of flowing within the manifold in the laminating direction.

However, in such a configuration, there will be differences in gas pressure between the near (or, proximal) side of the gas inlet (that is, the upstream) and the far (or, distal) side (the downstream) in the manifold, the difference being variations of the differential pressure in a longitudinal direction of the manifold. Thus, there is a tendency that the pressure in the manifold is higher in the proximal side of the gas inlet and lower in the distal side. Therefore, gas volume flowing into the power generation cells located upstream of the gas flow will be increased, on the other hand, gas volume flowing into the power generation cells located downstream of the gas flow will be decreased.

Consequently, the gas volume distributed to each power generation cell becomes nonuniform, as a result, the output voltage of the power generation cells located downstream will be decreased due to deficient gas supply, and this causes deterioration of the fuel cell performance of the stack as a whole. This phenomenon becomes increasingly prominent as the number of layers of the stack increases.

Patent Document 1: Japanese Patent Laid-Open No. 7-201353

DISCLOSURE OF THE INVENTION

The present invention has been made in view of the above described circumstances. The object of the present invention is to provide a solid oxide fuel cell which can stabilize output of the fuel cell and improve the output efficiency, by equalizing gas volume flowing into each power generation cell from an internal manifold of the fuel cell stack.

According to the present invention, there is provided a solid oxide fuel cell comprising: a fuel cell stack having alternately laminated power generation cells and separators having reactant gas passages; and a reactant gas supply manifold extending through the fuel cell stack in the laminating direction for supplying reactant gas to each of the power generation cells through the gas passages of the separators communicated with the manifold, wherein the manifold and the gas passages of the separators are in communication with each other through a gas-flow throttle mechanism.

In the solid oxide fuel cell described above, the gas-flow throttle mechanism may comprise a through-hole extending through the separator in the laminating direction. In this case, it is preferable that the through-hole is formed narrower than the gas passage.

Further, in the solid oxide fuel cell, the reactant gas is preferably introduced from both sides of the manifold.

According to the present invention, since the manifold and the separators are in communication with each other through the gas-flow throttle mechanism (the through-hole), a pressure loss at the gas-flow throttle mechanism is enlarged compared to a pressure loss in the manifold, and variations of the pressure loss in the downstream of the manifold are reduced. This, therefore, permits avoidance of reduction of the gas volume flowing into power generation cells located downstream of the gas flow, and also even distribution of reactant gas to each of the power generation cells in the laminating direction of the fuel cell stack. Thus, the power generating capacity of each power generation cell can be equalized as well. As a result, output of the fuel cell can be stabilized and the output efficiency can be improved.

In this case, since the through-hole is formed narrower than the gas passage, unwanted pressure loss of the supply gas is not generated at the connecting portion between the gas passages and the through-holes of the separators, and the reactant gas introduced into the through-holes from the manifold is efficiently supplied to the gas passages of the separators.

In addition, according to the present invention, by supplying the reactant gas from both sides of the manifold, variations of the pressure loss in the downstream of the manifold are reduced compared to a case where the reactant gas is supplied from one side of the manifold, whereby more effective even distribution of the reactant gas can be realized.

BRIEF DESCRIPTION OF THE DRAWINGS

FIG. 5 is a perspective view showing another structure of the gas introducing portion of the separator shown in FIG. 3.

DETAILED DESCRIPTION OF THE INVENTION

The embodiment of the present invention will be described below with reference to the drawings.

Figure 1:
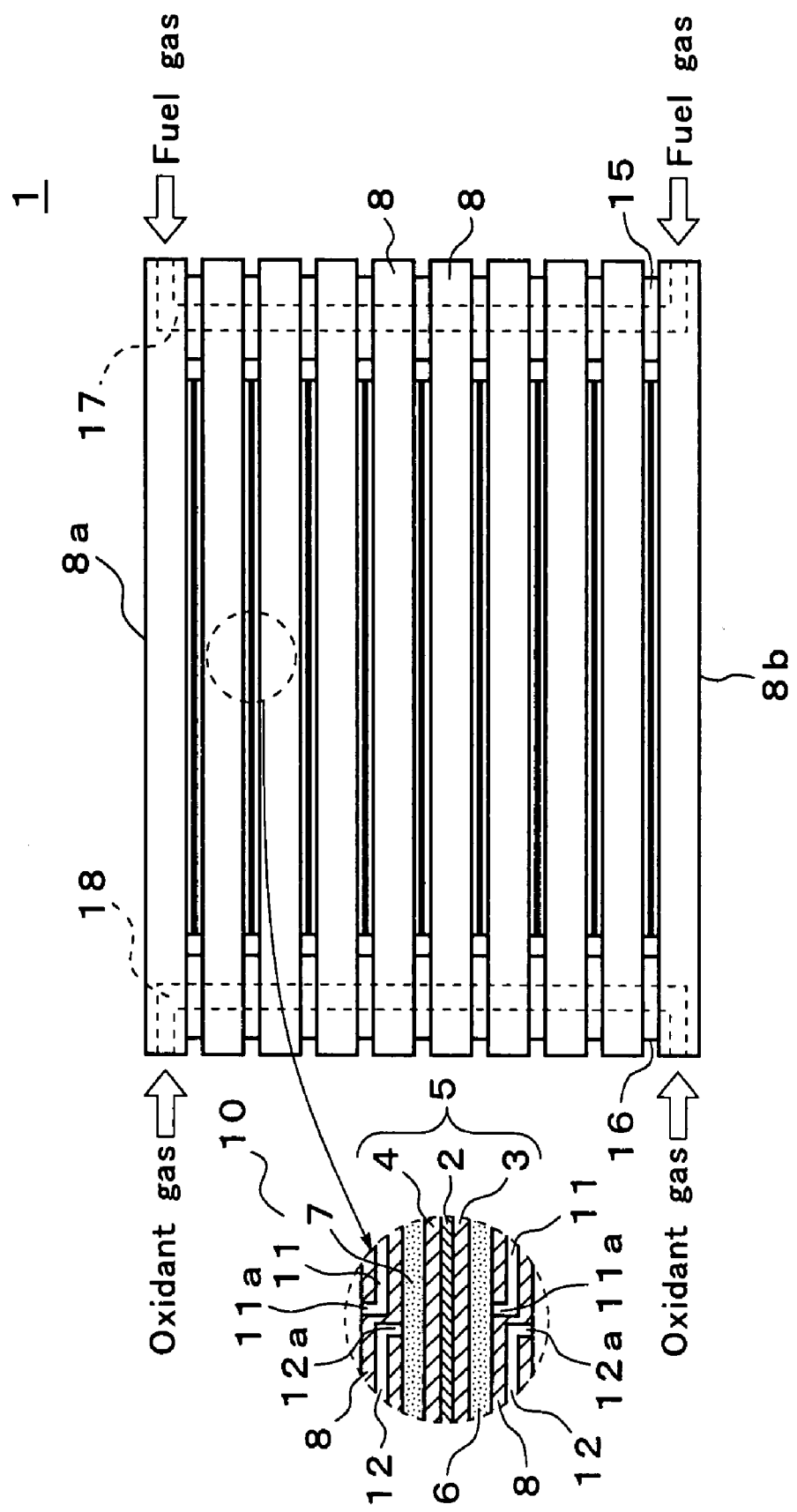
FIG. 1 is a view showing a configuration of a flat plate laminated type solid oxide fuel cell stack according to the present invention.
Figure 2:
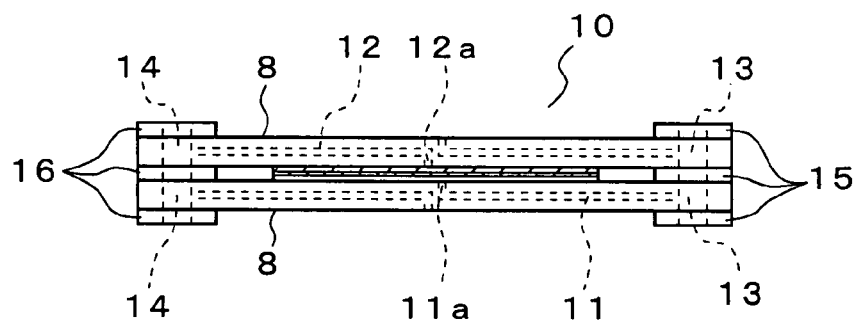
FIG. 2 is a view showing a configuration of a unit cell according to the present invention.
Figure 3:
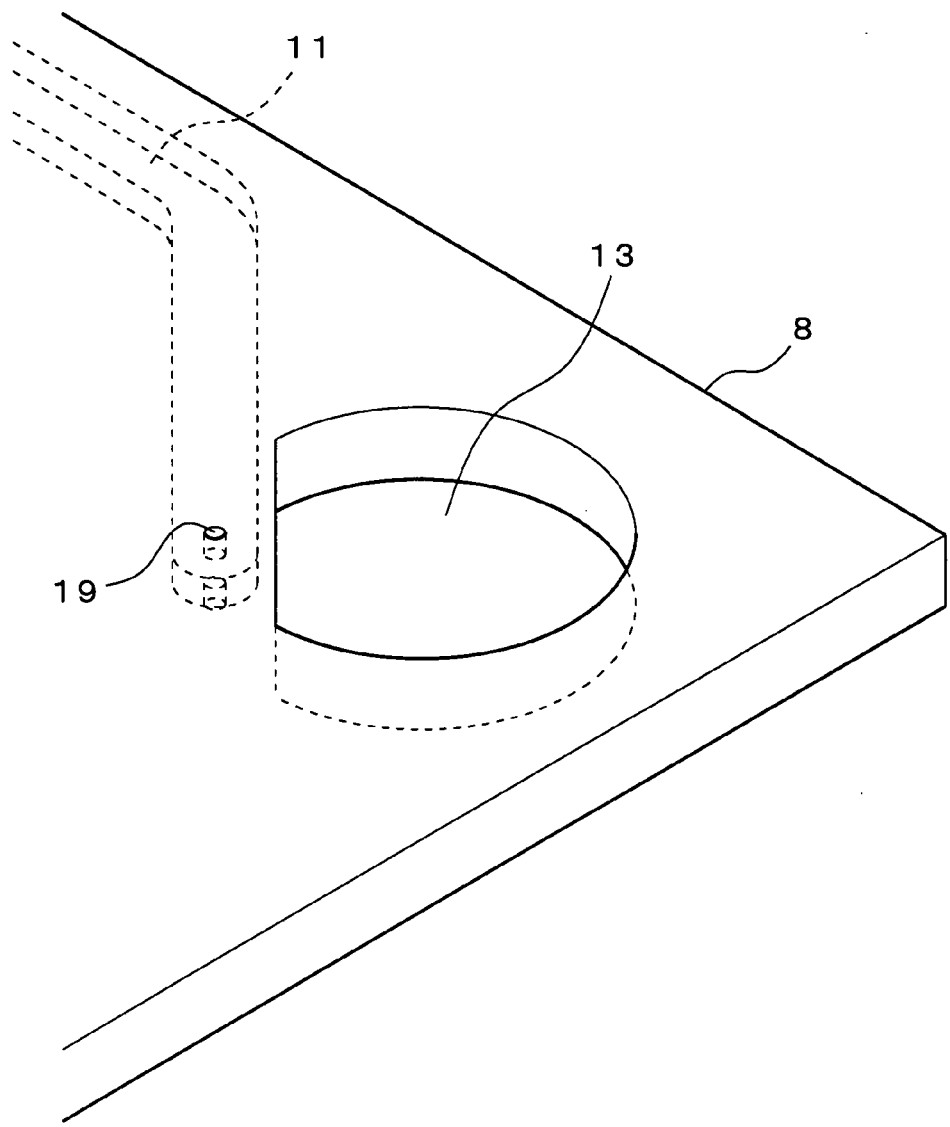
FIG. 3 is a perspective view showing a structure of gas introducing portion of a separator.
Figure 4:
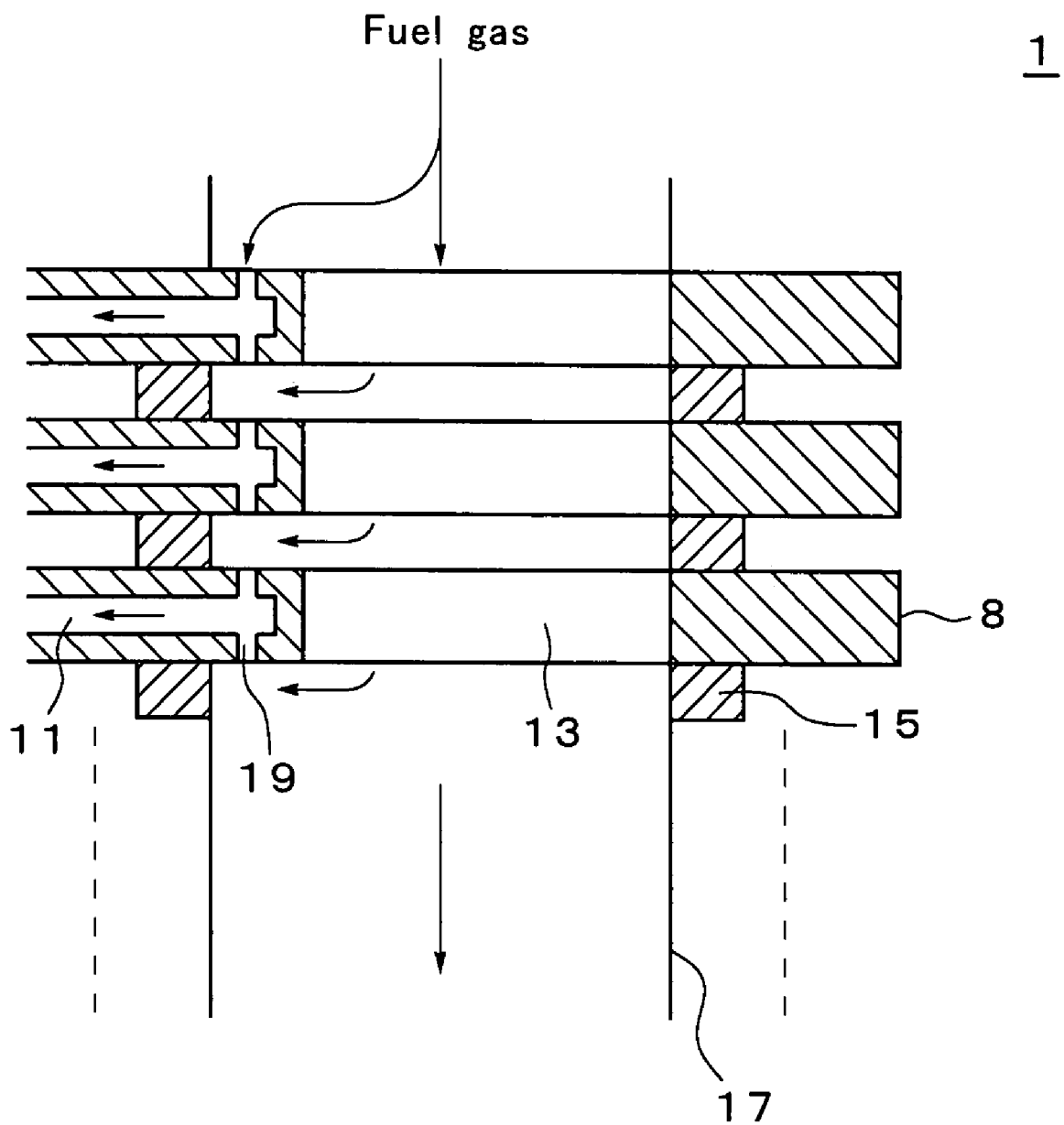
FIG. 4 is a longitudinal sectional view showing a structure of a gas introducing portion of the separator and a fuel gas manifold in the fuel cell stack.
Figure 6:
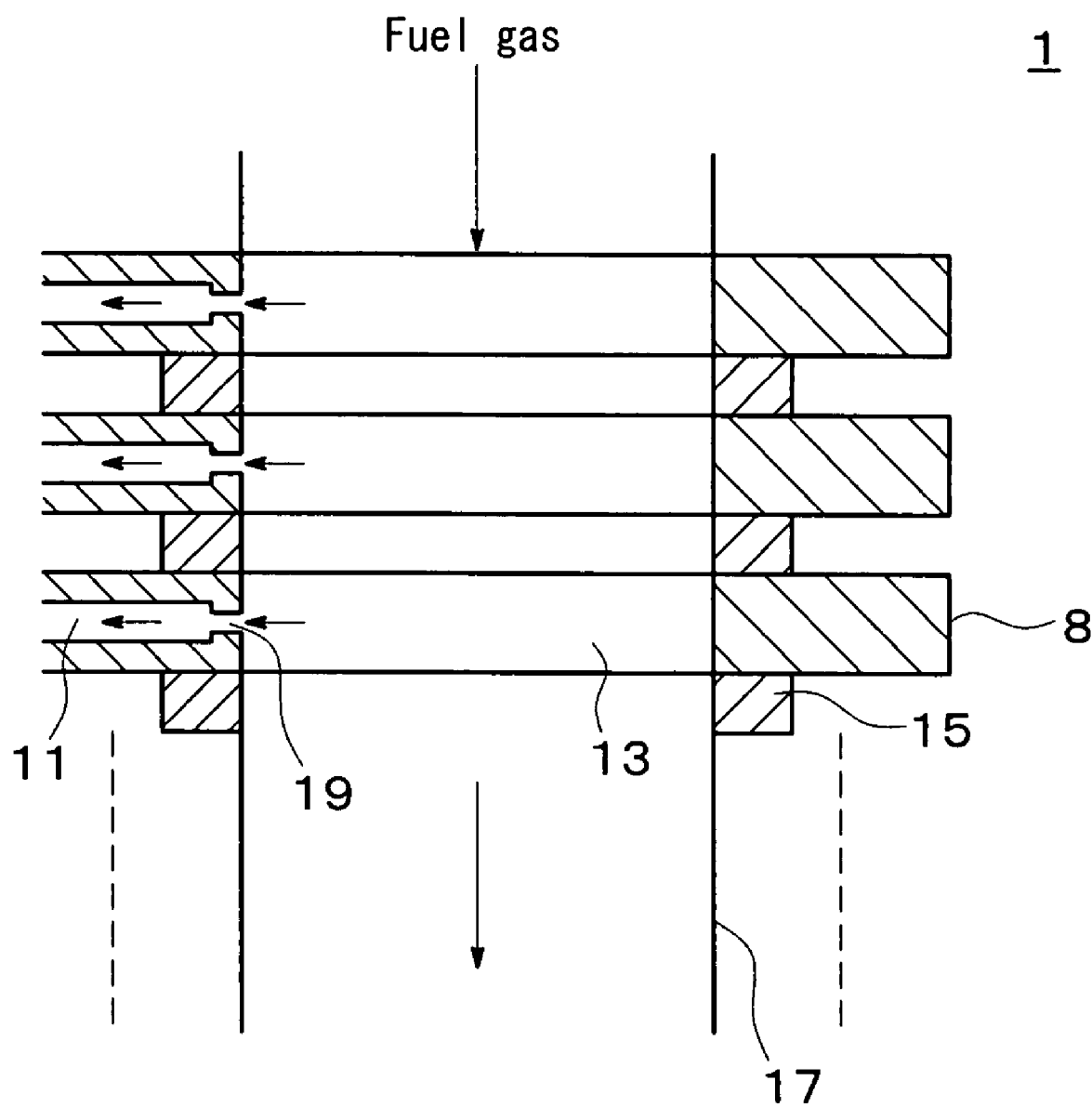
FIG. 6 is a longitudinal sectional view showing another structure of the gas introducing portion of the separator and the fuel gas manifold in the fuel cell stack shown in FIG. 4.

FIG. 1 shows a configuration of a flat plate laminated type solid oxide fuel cell stack according to the present invention; FIG. 2 shows a configuration of a unit cell according to the present invention; FIGS. 3 and 5 show structures of a gas introducing portion of a separator; and FIGS. 4 and 6 show structures of the gas introducing portion of the separator and a fuel gas manifold in the fuel cell stack.

As shown in FIGS. 1 and 2, the flat plate laminated type solid oxide fuel cell stack 1 is constructed by: laminating a plurality of unit cells 10 comprising a power generation cell 5 in which a fuel electrode layer 3 and an air electrode layer 4 are arranged on both surfaces of a solid electrolyte layer 2, a fuel electrode current collector 6 on the outer side of the fuel electrode layer 3, an air electrode current collector 7 on the outer side of the air electrode layer 4, and separators 8 on the outer side of each of the current collectors 6, 7 to form a stack structure; and applying load by means of bolting or the like in the laminating direction from both ends of the stack so that elements of the stack are pressure bonded and closely overlapped to each other.

Among elements of the unit cell 10, the solid electrolyte layer 2 is formed of stabilized zirconia (YSZ) doped with yttria, and the like. The fuel electrode layer 3 is formed of a metal such as Ni, Co, or a cermet such as Ni-YSZ, Co-YSZ. The air electrode layer 4 is formed of $LaMnO_3$, $LaCoO_3$ and the like. The fuel electrode current collector 6 is formed of a sponge-like porous sintered metallic plate such as a Ni-based alloy, and the air electrode current collector 7 is formed of a sponge-like porous sintered metallic plate such as an Ag-based alloy. The separator 8 is formed of stainless steel and the like.

In this embodiment, the separator 8 is made of a stainless steel plate having a thickness of 2 mm to 3 mm. The separator 8 has a function of electrically connecting the power generation cells 5 to each other and of supplying reactant gas to the power generation cell 5. The separator 8 has a fuel gas passage 11 which introduces fuel gas from an outer peripheral part of the separator 8 and which discharges the fuel gas from a center portion 11a of a separator surface facing the fuel electrode current collector 6, and an oxidant gas passage 12 which introduces oxidant gas from an outer peripheral part of the separator 8 and which discharges the oxidant gas from a center portion 12a of a separator surface facing the air electrode current collector 7.

In addition, a pair of gas openings 13, 14 extending through the separator 8 in the thickness direction is formed at both peripheral sides of the separator 8. Among these openings, one opening 13 is in communication with the fuel gas passage 11, and the other opening 14 is in communication with the oxidant gas passage 12. That is, fuel and oxidant gases can be supplied on each electrode surface of the power generation cell 5 from corresponding gas openings 13, 14 through the gas passages 11, 12. The gas openings of any two vertically-adjacent separators 8 are in communication with each other through ring-shaped insulating gaskets 15 and 16.

A tubular fuel gas manifold 17 and a tubular oxidant gas manifold 18, which extend in the laminating direction in the stack, are formed by connecting (stacking) the respective gaskets 15, 16 in the laminating direction through the corresponding gas openings 13, 14 of each separator 8. Fuel gas and oxidant gas are introduced into these manifolds 17, 18 from the exterior portion, and then distributed and supplied to each electrode of each power generation cell 5 through throttle mechanisms 19, which will be described below, and the gas passages 11, 12 from the gas openings 13, 14 of each separator 8.

In this embodiment, external pipes (not shown) are connected to the side portion of the end plates 8a, 8b located at both ends of the stack so that fuel gas and oxidant gas (air) are supplied from both sides of the manifolds 17, 18, as shown in FIG. 1.

In the separator 8, through-holes 19 (gas-flow throttle mechanisms) are extended through the gas passage 11 in the thickness direction adjacent to each gas opening 13 having a substantially circular shape, as shown in FIGS. 3 and 4. The through-hole 19 and the gas passage 11 are in communication with each other within the separator 8, so that the fuel gas manifold 17 and the gas passage 11 of the separator 8 are in communication with each other in the laminating direction (at the upper and lower ends of the through-hole 19).

The diameter of the through-hole 19 is much smaller than that of the fuel gas manifold 17, and is set, for example, approximately 0.8φ when the diameter of the manifold 17 is set approximately 15φ, thereby pressure loss can be caused at the throttle mechanism. In addition, the diameter (0.8φ) of the through-hole 19 is smaller than that of the fuel gas passage 11, for example, cross-section of which is a rectangular shape of approximately 3 mm×1.5 mm. Accordingly, it is possible to prevent pressure loss at the connecting portion between the through-hole 19 and the fuel gas passage 11 from being produced, when the gas is supplied from the manifold.

As shown by arrows in the FIG. 4, fuel gas introduced into the through-hole 19 from the fuel gas manifold 17 is effectively supplied to the fuel gas passages 11 of the separators 8. The structure of the gas-flow throttle mechanism with the use of the through-hole 19 can be applied to the oxidant gas manifold 18 as well.

As described above, the pressure loss at the gas-flow throttle mechanism is increased in order to reduce variations of the pressure loss at the downstream within each of the manifolds 17, 18, so that reduction (variation) of the gas volume flowing into the power generation cells 5 located downstream of the gas flow can be avoided, and reactant gas is distributed evenly to each of the power generation cells 5 in the laminating direction of the fuel cell stack. Accordingly, output of the fuel cell can be stabilized and the output efficiency can be improved.

It is noted that, in this embodiment, the variations of the pressure loss in the downstream is significantly decreased from 15% to 5%, compared to the structure in which the gas-flow throttle mechanism is not provided between the gas passage and the gas opening of the separator.

Further, another embodiment of the gas-flow throttle mechanism can be adopted in which the fuel gas manifold 17 and the fuel gas passage 11 of the separator 8 are in communication with each other via the through-hole 19 in the lateral direction (that is, the direction intersecting with the manifold) as shown in FIGS. 5 and 6. In this case, since the diameter of the through-hole 19 is much smaller than that of the fuel gas manifold 17, pressure loss can be caused at the throttle mechanism. Besides, the diameter of the through-hole 19 is smaller than that of the fuel gas passage 11. Accordingly, as well as the embodiment described above, it is possible to prevent unnecessary pressure loss at the connecting portion between the through-hole 19 and the fuel gas passage 11 from being produced, when the gas is introduced from the manifold.

Needless to say, the structure of the gas-flow throttle mechanism described above can be applied to the oxidant gas manifold 18 as well.

Furthermore, in this embodiment, since the reactant gas is supplied from both ends of the manifold, variations of the pressure loss in the downstream of the manifold can be suppressed compared to a case where the reactant gas is supplied from one side of the manifold. Therefore, even distribution of the reactant gas can be realized more effectively. Further, in this embodiment, external reactant gases turn at the inlet portion, just after the gases flow into each manifold from both ends of the manifold in the lateral direction perpendicular to the manifold, and then flow within the manifold in the longitudinal direction (the laminating direction). The commutation effect obtained by changing the direction of the gas flow at the inlet portion also makes a substantial contribution to realizing more effective even distribution of the reactant gas through the manifolds. Such a reactant gas-supplying configuration may be more effective, as the number of the laminating layers is increased.

The throttle mechanism 19 according to the present invention can be applied to both of the fuel gas manifold 17 and the oxidant gas manifold 18. However, it is important that the throttle mechanism 19 should be applied to at least fuel gas supply side (the fuel gas manifold), since uniform distribution of the fuel gas in the fuel gas supply side makes a great difference in the power generating performance and the efficiency of the fuel cell.

Industrial Applicability

According to the present invention, gas volume distributed into each power generation cell through an internal manifold formed in a fuel cell stack can be equalized. In addition, output of the fuel cell can be stabilized and the output efficiency can be improved.

The invention claimed is:

1. A solid oxide fuel cell comprising:
   a fuel cell stack having alternately laminated power generation cells and separators, the power generation cells and the separators alternating in a laminating direction of the fuel cell stack;
   a reactant gas passage extending through each of the separators; and
   a reactant gas supply manifold extending through the fuel cell stack in the laminating direction for supplying reactant gas to each of the power generation cells, the manifold being in fluid communication with the gas passages of the separators so as to supply the reactant gas through the gas passages to each of the power generation cells,
   wherein the manifold is in fluid communication with the gas passages of the separators through a gas-flow throttle mechanism,
   wherein the gas-flow throttle mechanism comprises a plurality of through-holes, the through-holes extending through the separators, respectively,
   wherein each of the separators has a first surface facing in the laminating direction and a second surface on an opposite side of the separator from the first surface, and the gas passage extending through each separator is confined between the first surface and the second surface thereof, and
   wherein the gas passage extending through each separator penetrates the first surface at a discharge point for discharging the reactant gas to the power generation cells.

2. The solid oxide fuel cell according to claim 1, wherein the through-hole extending through each separator is narrower than the gas passage formed therein.

3. The solid oxide fuel cell according to claim 1, wherein the reactant gas is introduced from both sides of the manifold.

4. The solid oxide fuel cell according to claim 1, wherein a portion of each of the separators is disposed between one of the through-holes and the manifold in a direction perpendicular to the laminating direction.

5. The solid oxide fuel cell according to claim 1, wherein the manifold extends through the fuel cell stack in the laminating direction from a top to a bottom of the fuel cell stack; and
   wherein the gas passages extend through the separators, respectfully, in a direction perpendicular to the laminating direction.

6. The solid oxide fuel cell according to claim 5, wherein the manifold is formed by gas openings extending through the separators, respectively, and by gaskets disposed between the separators, respectively;
   wherein the gaskets circumscribe the gas openings, respectively, and circumscribe the through-holes, respectively, such that the through-holes are in fluid communication with the manifold.

7. The solid oxide fuel cell according to claim 1, wherein the manifold is formed by gas openings extending through the separators, respectively, and by gaskets disposed between the separators, respectively.

8. The solid oxide fuel cell according to claim 1, wherein the manifold is formed by gas openings extending through the separators, respectively, and by gaskets disposed between the separators, respectively;
   wherein the gaskets circumscribe the gas openings, respectively, and circumscribe the through-holes, respectively, such that the through-holes are in fluid communication with the manifold.

9. A solid oxide fuel cell comprising:
   a fuel cell stack having power generation cells and separators, the power generation cells and the separators being alternately provided in a laminating direction of the fuel cell stack;
   a reactant gas passage extending through each of the separators; and
   a reactant gas supply manifold extending through the fuel cell stack in the laminating direction for supplying reactant gas to each of the power generation cells, the manifold being in fluid communication with the gas passages of the separators so as to supply the reactant gas through the gas passages to each of the power generation cells, wherein the manifold is in fluid communication with the gas passages of the separators through a gas-flow throttle mechanism, wherein the gas-flow throttle mechanism comprises a plurality of through-holes, the through-holes extending completely through the separators, respectively, wherein each of the separators has a first surface facing in the laminating direction and a second surface on an opposite side of the separator from the first surface, and the gas passage extending through each separator is enclosed by the first surface and the second surface thereof, wherein the gas passage extending through each separator penetrates the first surface at a discharge point for discharging the reactant gas to the power generation cells, wherein each of the through-holes extends through a gas passage such that each of the gas passages is in fluid communication with the manifold, wherein the through-hole extending through each separator is narrower than the gas passage formed therein, wherein a portion of each of the separators is disposed between one of the through-holes and the manifold in a direction perpendicular to the laminating direction, wherein the manifold extends through the fuel cell stack in the laminating direction from a top to a bottom of the fuel cell stack, wherein the gas passages extend through the separators, respectfully, in a direction perpendicular to the laminating direction, wherein the manifold is formed by gas openings extending through the separators, respectively, and by gaskets disposed between the separators, respectively, wherein the gaskets circumscribe the gas openings, respectively, and circumscribe the through-holes, respectively, such that the through-holes are in fluid communication with the manifold.

10. A solid oxide fuel cell comprising:
a fuel cell stack having alternately laminated power generation cells and separators, the power generation cells and the separators alternating in a laminating direction of the fuel cell stack;
a fuel gas passage extending through each of the separators;
an oxidant gas passage extending through each of the separators;
a fuel gas supply manifold extending through the fuel cell stack in the laminating direction for supplying fuel gas to each of the power generation cells, the fuel gas supply manifold being in fluid communication with the fuel gas passages of the separators so as to supply the fuel gas through the fuel gas passages to each of the power generation cells;
a oxidant gas supply manifold extending through the fuel cell stack in the laminating direction for supplying oxidant gas to each of the power generation cells, the oxidant gas supply manifold being in fluid communication with the oxidant gas passages of the separators so as to supply the oxidant gas through the oxidant gas passages to each of the power generation cells; and
a gas-flow throttle mechanism connecting the fuel gas supply manifold to the fuel gas passages and connecting the oxidant gas supply manifold to the oxidant gas passages,
wherein the gas-flow throttle mechanism comprises a plurality of through-holes, the through-holes extending through the separators, wherein each of the separators has a first surface facing in the laminating direction and a second surface on an opposite side of the separator from the first surface, the fuel gas passage and the oxidant gas passage extending through each separator being enclosed by the first surface and the second surface thereof, wherein the fuel gas passage extending through each separator penetrates the first surface at a fuel discharge point for discharging the fuel gas to the power generation cells, and wherein the oxidant gas passage extending through each separator penetrates the second surface at a oxidant discharge point for discharging the oxidant gas to the power generation cells.

11. The solid oxide fuel cell according to claim 10, wherein the through-holes are narrower than the fuel gas passages and the oxidant gas passages.

12. The solid oxide fuel cell according to claim 10, wherein the fuel gas is introduced from both sides of the manifold, and the oxidant gas is introduced from both sides of the manifold.

13. The solid oxide fuel cell according to claim 10, wherein a portion of each of the separators is disposed between one of the through-holes and the manifold in a direction perpendicular to the laminating direction.

14. The solid oxide fuel cell according to claim 10, wherein the manifold extends through the fuel cell stack in the laminating direction from a top to a bottom of the fuel cell stack; and
wherein the fuel gas passages and the oxidant gas passages extend through the separators, respectfully, in a direction perpendicular to the laminating direction.

15. The solid oxide fuel cell according to claim 14, wherein the manifold is formed by gas openings extending through the separators, respectively, and by gaskets disposed between the separators, respectively;
wherein the gaskets circumscribe the gas openings, respectively, and circumscribe the through-holes, respectively, such that the through-holes are in fluid communication with the manifold.

16. The solid oxide fuel cell according to claim 10, wherein the manifold is formed by gas openings extending through the separators, respectively, and by gaskets disposed between the separators, respectively.

17. The solid oxide fuel cell according to claim 10, wherein the manifold is formed by gas openings extending through the separators, respectively, and by gaskets disposed between the separators, respectively;
wherein the gaskets circumscribe the gas openings, respectively, and circumscribe the through-holes, respectively, such that the through-holes are in fluid communication with the manifold.

18. The solid oxide fuel cell according to claim 1, wherein the discharge point of the gas passage in each separator is disposed at a center portion of the separator.

19. The solid oxide fuel cell according to claim 1, wherein the gas passage in each separator has a first distal end and a second distal end, the first distal end being connected to the manifold and the second distal end being the discharge point, and
wherein the discharge point of the gas passage in each separator is disposed at a center portion of the separator.

20. The solid oxide fuel cell according to claim 1, wherein each of the separators has a closed-face configuration which encloses the reactant gas passage.

* * * * *